June 25, 1935.   G. A. JUHLIN   2,006,170
WINDING FOR THE STATIONARY MEMBERS OF ALTERNATING
CURRENT DYNAMO ELECTRIC MACHINES
Filed April 30, 1934
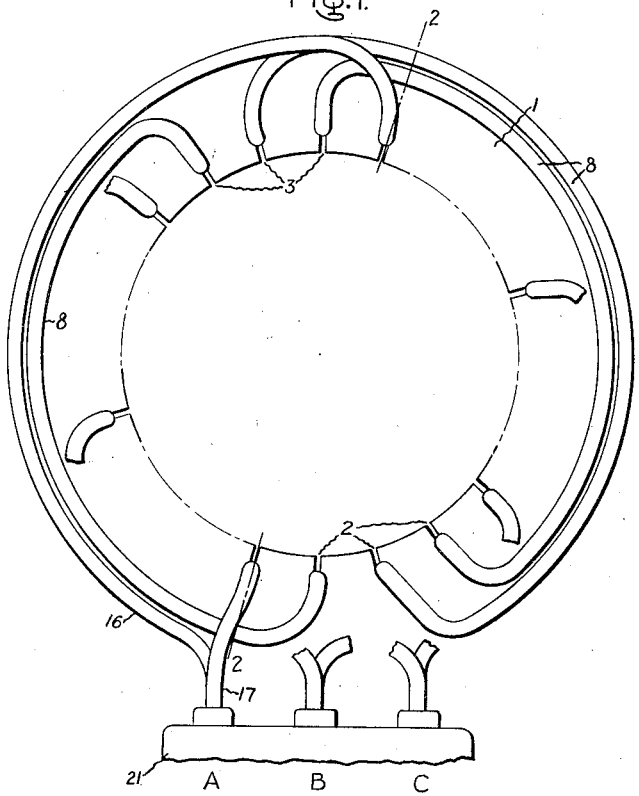
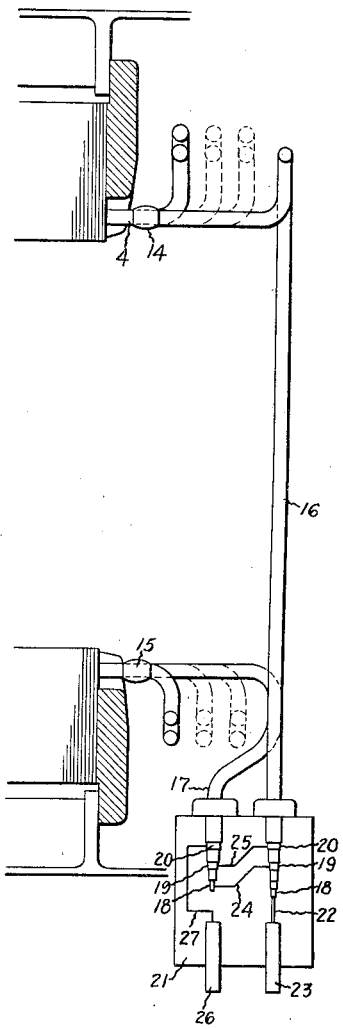
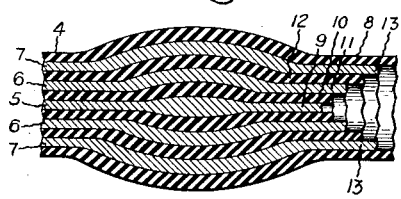
Inventor:
Gustaf A. Juhlin,
by Harry E. Dunham
His Attorney Patented June 25, 1935

2,006,170

UNITED STATES PATENT OFFICE 2,006,170

WINDING FOR THE STATIONARY MEMBERS OF ALTERNATING CURRENT DYNAMO-ELECTRIC MACHINES

Gustaf Adolf Juhlin, Timperley, England, assignor to General Electric Company, a corporation of New York Application April 30, 1934, Serial No. 723,245
In Great Britain May 11, 1933

2 Claims. (Cl. 171—206)

My invention relates to a winding for the stationary members of alternating-current dynamo-electric machines which is constructed from conductors having a plurality of concentric conducting elements. Windings of this type are connected so that corresponding conducting elements are parts of separate circuits which are connected in series. The circuits formed by the innermost or center conducting elements of the conductors is preferably at the highest voltage, and the circuit formed by the outer conducting elements is at the lowest voltage.

In windings of this type it has been found impossible to make the winding from a single length of conductor owing to the great length of conductor which would have to be handled and also to the practical difficulty of bending the conductors in order to form the end connection without having a very great overhang resulting in weakening the winding from a mechanical point of view. For this reason, conductors having concentric conducting elements have not been used for the end connections, and the corresponding conducting elements of the slot conductors have been connected together by means of separate conductors. With such an arrangement the end connector for the center element of the slot conductor has the full voltage to ground impressed upon it, and part of the advantage obtained by using concentric conductors is lost. According to my invention the end connectors are formed of concentric conductors having the same number of conducting elements as the slot conductors, and the respective conducting elements are concentrically joined together. In order to avoid the mechanical difficulty of bending concentric conductors, the end connectors are made in the configuration or shape required.

For a better understanding of my invention reference may be had to the accompanying drawing in which Fig. 1 is a diagrammatic end elevation of the stationary member of a two-pole, 3-phase, alternating-current dynamo-electric machine showing the end connectors for a single phase of the winding; Fig. 2 is a sectional view of the front end of the stationary member on line 2—2 of Fig. 1; and Fig. 3 is an enlarged sectional view of a joint between a slot and an end conductor.

Referring to the drawing, the field structure of the stationary member which is diagrammatically indicated at 1 is of the non-salient pole type in which the active portion of the winding is placed in slots which extend axially of the stationary member. The slots for one phase of the winding are indicated at 2 and 3 respectively. The active portion of the winding comprises a plurality of conductors 4 arranged in slots in the stationary member. Each of the slot conductors has three concentric conducting elements 5, 6 and 7 insulated from each other. The slot conductors extend a convenient distance beyond the end of the stationary member, as shown in Fig. 2. Corresponding conducting elements of the slot conductors 4 are connected together by end connectors 8 which likewise have three concentric conducting elements insulated from each other. The end connectors are made by cutting the center conductor 9 to the correct length and bending the conductor into the required shape or configuration for connecting two stator slot conductors. The conductor will usually have four bends, as shown in Fig. 2, the ends of the conductor being parallel to each other and spaced apart the same distance as the slot conductors which it is to connect. After forming the center conductor 9 to the required shape, a layer 10 of insulation is applied, and the intermediate conducting element 11 is laid over the surface of the layer of insulation. A layer of insulation 12 is then applied to the outside of the intermediate conductor, and the outer conducting element 13 is then laid in place over the insulation and the entire conductor is covered with insulation suitable for the required voltage. The end connector is thus formed to the desired shape without requiring any bending of the completed conductor which would mechanically weaken the conductor.

After the construction of the end connection, as above described, the end connection is joined to the slot conductors for which it is intended. The joints between two of the slot conductors and their respective end connectors are shown at 14 and 15, and an enlarged sectional view of one joint is shown in Fig. 3. In making such a joint, the center conducting element 5 of the slot conductor is joined to the center conducting element 9 of the end connector preferably by silver soldering, and insulation is applied over the joint. The intermediate conducting element 6 of the slot conductor is then joined to the intermediate connecting element 11 of the end connector, and a layer of insulation is applied thereto. Finally, the outer conducting element 7 of the slot conductor is joined to the outer conducting element 13 of the end connector, and the outer insulation is applied.

When the connection of the slot conductors by the end connectors is completed, there will be three complete circuits in each phase, one circuit consisting of all the center conducting elements 5, another consisting of all the intermediate conducting elements 6, and the third circuit consisting of all the outer conducting elements 7. In order to connect these circuits in series, leads 16 and 17 which also have three concentric conducting elements, 18, 19, and 20, are concentrically connected to each end of the phase winding and led to a terminal box 21, where the three separate circuits are connected in series. The center conducting element of lead 16 is connected by means of a conductor 22 to the high-voltage terminal 23, the center conducting element of lead 17 is connected to the intermediate conducting element of lead 16 by conductor 24, the intermediate conducting element of lead 17 is connected to the outer conducting element of lead 16 by conductor 25, and the outer conducting element of lead 17 is connected to the low-voltage terminal 26 by conductor 27. The voltage across the terminals 23 and 26 is the sum of the voltages across each of the separate circuits made up of corresponding concentric conducting elements. The terminals of all the phases may be contained in the same terminal box, as shown at A, B, and C in Fig. 1, and the interconnection of the windings may be made therein as desired.

Although I have shown a particular embodiment of my invention, I do not desire to be limited to the construction described, and I intend in the appended claims to cover all modifications which do not depart from the spirit and scope of my invention.

What I claim as new and desire to secure by Letters Patent of the United States, is:

1. A stationary member for a dynamo-electric machine, a winding for said stationary member comprising a plurality of conductors arranged in slots in said stationary member, each of said slot conductors comprising a plurality of concentric conducting elements insulated from each other, end connections each comprising a plurality of concentric conducting elements respectively connected to the concentric elements of said slot conductors for connecting the corresponding concentric elements of said slot conductors into separate circuits, and means for connecting said circuits in series.

2. A stationary member for a dynamo-electric machine, a winding for said stationary member comprising a plurality of conductors arranged in slots in said stationary member, each of said slot conductors comprising a plurality of concentric conducting elements insulated from each other, means including end connections each comprising a plurality of concentric conducting elements respectively connected to the concentric elements of said slot conductors for connecting the corresponding concentric elements of said slot conductors into separate circuits, a terminal box, means including leads each comprising a plurality of concentric conducting elements respectively connected to the concentric elements of said circuits for leading said circuits to said terminal box, and means arranged within said terminal box for connecting said circuits in series.

GUSTAF ADOLF JUHLIN.